UNITED STATES PATENT OFFICE.

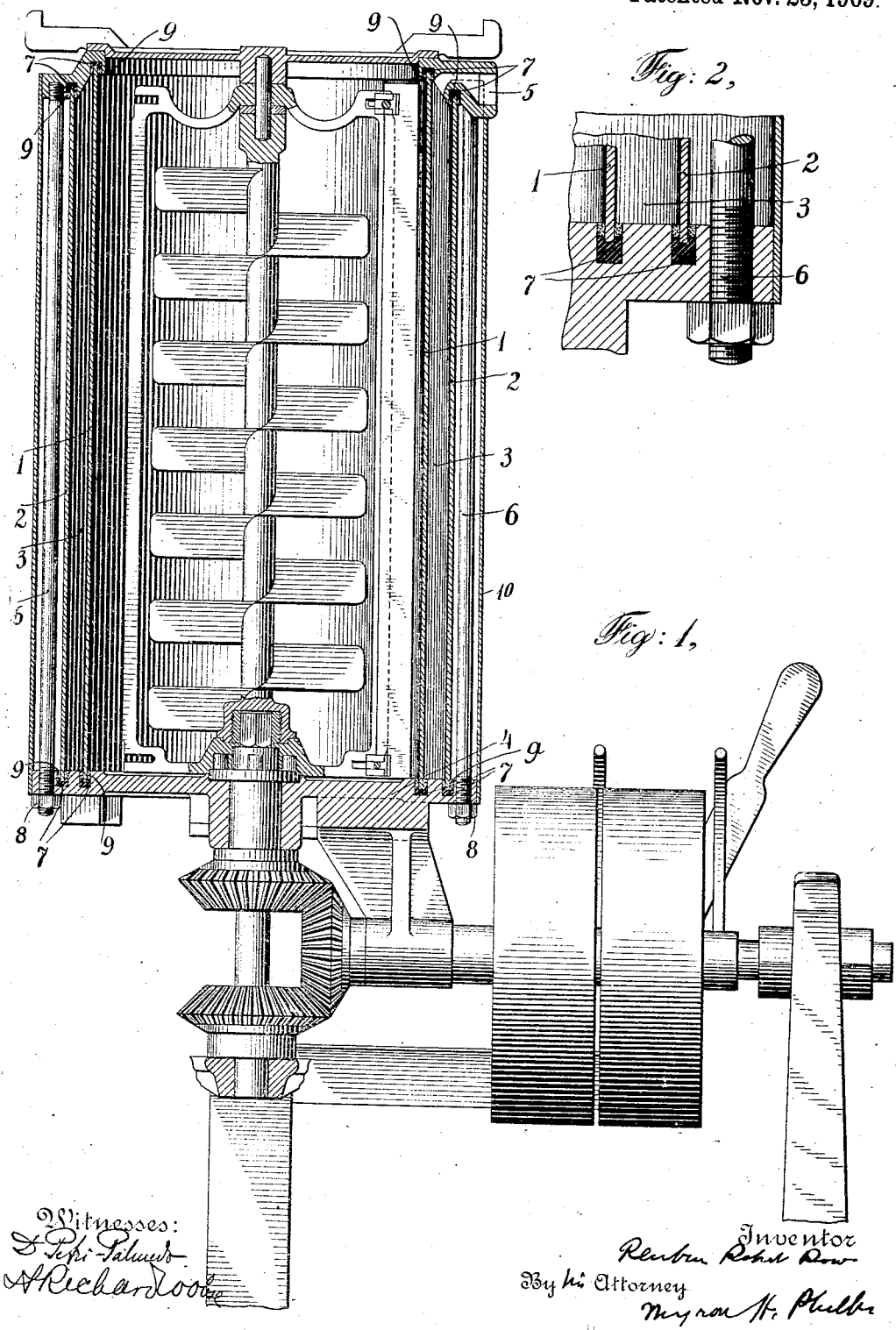

REUBEN ROBERT ROW, OF JERSEY CITY, NEW JERSEY, ASSIGNOR TO THE GRISCOM-SPENCER COMPANY, OF NEW YORK, N. Y., A CORPORATION OF NEW JERSEY.

ICE-CREAM MACHINERY.

941,172.　　　　Specification of Letters Patent.　　Patented Nov. 23, 1909.

Application filed February 19, 1909.　Serial No. 478,930.

*To all whom it may concern:*

Be it known that I, REUBEN ROBERT ROW, a citizen of the United States, residing in the city of Jersey City, county of Hudson, and State of New Jersey, have invented certain new and useful Improvements in Ice-Cream Machinery, of which the following is a specification.

My invention relates to ice cream freezing machines in which the cream is frozen by the circulation of a freezing fluid, the latter circulating in a chamber surrounding the receptacle in which the cream is placed.

In prior machines it has been usual to provide the freezing-fluid chamber by the use of concentric cylindrical shells attached by brazing, riveting, soldering or other permanent joint to rings or heads closing the tops and bottoms of the cylinders. The making of this joint involves expense in manufacture, and it is objectionable in that whenever it is necessary to disconnect the heads from the cylinders in order to effect repairs, the service of skilled metal-working artisans is required.

My present invention is intended to reduce this manufacturing expense and to avoid the cost and trouble in making repairs incident to the use of skilled labor. To this end I propose to provide a detachable joint between the cylinders and the heads. This joint I make fluid proof by means of gaskets of rubber or other suitable material, at the same time protecting the rubber against the destructive action of the contents of the freezer by the application to the rubber of a layer of suitable cement, as marine glue, or other appropriate plastic compound.

In the drawings annexed hereto and forming part of this specification Figure 1 is a vertical view partly in section of my improved apparatus; and Fig. 2 is a sectional enlarged view of the joint.

Referring to the drawings, the ice cream freezer is made up of two heads 4 and 5 connected by concentric cylindrical shells 1 and 2 between which is the freezing fluid chamber 3. The ends of the shells are received in circular grooves in the two heads and abut respectively against gaskets 7 of rubber, or other compressible material. The heads are drawn toward each other and tightened upon the shells by rods 6 which pass loosely through holes in head 4, are screwed into the other head 5 and are forced home to secure the required degree of tightness in the joint by the nuts 8 bearing upon the head 4. A layer of cement 9 is placed in each groove over the rubber. This serves to give the joint a higher degree of security against the passage of the fluid and also to protect the gasket from injurious action of the fluid. An inclosing shell 10 is suitably attached by screws or otherwise to the heads. Within the shells are shown two sets of dashers or blades revolved in opposite directions by appropriate gearing. The specific construction of this part of the apparatus is, of course, immaterial to my present invention, which is concerned only with the joints between the heads and the shells.

Under the term cement as used herein, I intend to include any kind of plastic and adhesive material suitable for the purpose of fortifying the joint and protecting the gaskets from the fluid.

The gasket may be made of any suitable compressible substance. I find that india rubber gives good service for this purpose.

The improvement herein described is capable of application to a freezer horizontally arranged as well as of the vertical type shown.

The gaskets need not necessarily be set in grooves, and their shape may be modified from that shown.

It will be understood that with this construction all that is needed to obtain access to the interior of the freezer and to remove the shells, or either of them, for the purpose of repair or replacement, is to take off the inclosing shell 10 and to loosen the nuts 8, which can be done by any intelligent person whether or not he is an artisan skilled in metal working.

Claims—

1. An ice cream freezer provided with a chamber about the same for the circulation of a freezing fluid, said chamber being formed by two concentric cylinders the ends of which are received in grooves of the heads and rest against gaskets, the gaskets being protected by cement, substantially as set forth.

2. In an ice cream freezer, the combination of the heads, the cylindrical chamber walls, and the gaskets against which the ends of the walls rest, the security of the joint being reinforced and the rubber protected by a layer of cement placed over the latter, substantially as set forth.

3. In an ice cream freezer, the combination of the chamber walls 1 and 2, the heads 4 and 5 provided with grooves, and the gaskets 7 protected by cement, substantially as set forth.

4. In an ice cream freezer, a joint between the cylinder and the head consisting of a compressed rubber gasket protected by a layer of marine glue, substantially as set forth.

In witness whereof, I have signed my name in the presence of two witnesses.

REUBEN ROBERT ROW.

Witnesses:
  GEO. H. HULL,
  S. H. BUNNELL.